United States Patent [19]

Brandenburg et al.

[11] 3,907,763

[45] Sept. 23, 1975

[54] INSULIN DERIVATIVES CROSSLINKED BY A DICARBOXYLIC ACID MOIETY

[75] Inventors: Dietrich Brandenburg, Schmithof, uber Aachen; Walter Puls, Wuppertal, both of Germany

[73] Assignee: Bayer Aktiengesellschaft, Germany

[22] Filed: Feb. 16, 1973

[21] Appl. No.: 333,361

[30] Foreign Application Priority Data
Mar. 1, 1972 Germany............................ 2209835

[52] U.S. Cl.............................. 260/112.7; 424/178
[51] Int. Cl.[2]................. A61K 37/26; C07C 103/52
[58] Field of Search.................................. 260/112.7

[56] References Cited
UNITED STATES PATENTS
3,679,653  7/1972  Schuck et al................... 260/112.7

FOREIGN PATENTS OR APPLICATIONS
1,584,535  12/1969  France

OTHER PUBLICATIONS

Kagedal et al.; Acta Chem. Scan., 25, 1855–1859 (1971).

Csorba et al.; Horm. Metab. Res., 2, 305 (1970); from Chem. Abstr. 74:38373q.

*Primary Examiner*—Lewis Gotts
*Assistant Examiner*—Reginald J. Suyat

[57] ABSTRACT

Insulin derivatives in which the A-1 and B-29 free amino groups are crosslinked by a bridge of the formula —CO—X—CO— in which X is a carbon-carbon bond or an aliphatic group are described together with their method of preparation and use.

27 Claims, 4 Drawing Figures

INSULIN DERIVATIVES CROSSLINKED BY A DICARBOXYLIC ACID MOIETY

The present invention pertains to new monomeric insulin derivatives in which the A and B chains are crosslinked via the A-1 and B-29 amino groups, to their preparation, and to their medicinal use as antidiabetic agents.

It is known that insulin can be chemically modified by means of various monofunctional reagents. Some of these derivatives can be isolated in the homogeneous form and possess modified biological properties, see, e.g., Levy et al., Biochemistry 6, 3559 (1967); Lindsay et al., Biochem J. 121, 737 (1971); and Africa et al., Biochemistry 9, 1962 (1970). In the reaction of insulin with bifunctional reagents on the other hand, it has generally hitherto been possible to obtain only heterogeneous mixtures without a single reaction product; see e.g., DDR Pat. No. 10,002; Zahn et al., Makromol. Chem. 26, 153 (1958). In these cases, the bifunctional reagent appears to react with the various functional groups of the insulin molecule. In addition to monomeric derivatives, higher-molecular products with an indeterminate degree of polymerization are also produced. Moreover the known homogeneous insulin derivatives with an intramolecular bridge, such as the m-phenylenedithiocarbamoyl bridge, have proved to be biologically inactive; see Brandenburg et al., Diabetes, Proc. 7th Congress Int. Diabetes Fed. Buenos Aires, 1970. Excerpta Medica Int. Congr. Series 231, 363 (1971).

The present invention provides new biologically active insulin derivatives in which the α-amino group of glycine $^{A-1}$ of the A-chain is bifunctionally crosslinked to the ε-amino group of lysine $^{B-29}$ of the B-chain by a group of the formula:

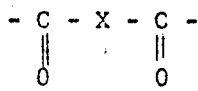

in which
X is a direct carbon-carbon bond or an aliphatic hydrocarbon chain with 1–15 C atoms, of which one or more carbon atoms are optionally replaced by one or more hetero atoms or groups of hetero atoms, and either unsubstituted or substituted by hydrophilic groups.

This invention also provides a process for the production of the compounds defined above in which insulin is reacted with an activated derivative of a dicarboxylic acid of the general formula:

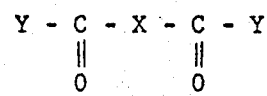

in which
X is as defined above, and
Y is a radical that activates the carboxylic acid groups of the acid,
in a polar organic solvent or in a mixture of an organic solvent and water, in the presence of a proton acceptor.

The new compounds thus produced are preferably purified to remove accompanying by-products and other impurities by a separation process which differentiates the products firstly according to molecular weight and secondly according to their charge. Preferably this separation process is followed by a precipitation of the new compound in crystalline form from a solution containing a zinc salt.

Only intramolecularly crosslinked insulin derivatives in which the amino groups of glycine A-1 and lysine B-29 are linked are formed in the crosslinking reaction according to the invention. It is thus possible to dispense with the temporary protection of the B-1 (phenylalanine) -amino groups, even though it could have been expected, from the state of the art, that this amino group would also be substituted to a high degree; see e.g., Lindsay et al., Biochem. J. 121, 737 (1971); Levy et al., Biochemistry 6, 3559 (1967). It is equally unexpected that side-reactions at tyrosine- and serine-OH groups do not occur; see e.g., Zahn et al., Angew. Chem. 75, 377 (1963).

The present insulin derivatives possess a higher blood sugar-lowering action than most monofunctionally substituted insulin derivatives and other bifunctionally crosslinked insulins which are known.

Advantageously, the present insulin derivatives can by crystallized from solutions containing zinc salts, thereby permitting administration in the form of crystal suspensions which, as is known, are employed with insulin to achieve prolonged action.

A preferred class of the present compounds are those depicted by the formula:

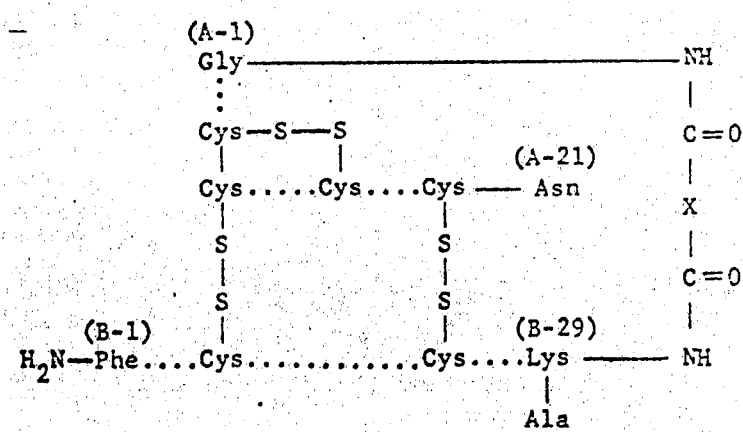

wherein X is carbon-carbon bond or an alkylene chain containing 1 to 15 carbon atoms, from 0 to 2 of said carbon atoms being replaced by a corresponding number of sulfur, oxygen or imino groups, said alkylene chain being unsubstituted or substituted by one or two amino groups.

The above depiction of the insulin molecule has been modified from the conventional format for graphic convenience, it being understood the insulin molecule in fact is identical with the known structure save for the presence of the crosslinking bridge.

In Formulas I and II, X is preferably a carbon-carbon bond or an alkylene group of from 1 to 15 carbon atoms, most preferably, the group $—(CH_2)_n—$ where n has a value of 1 to 15. Y is preferably an optionally substituted phenoxy radical.

If beef insulin and the bis-p-nitrophenyl ester of adipic are used as the starting substances, the course of the reaction in the process of the invention can be represented in the specification by the following:

trichlorophenyl ester, N-benzyloxycarbonyl-glutamic acid $\alpha$, $\gamma$-bis-p-nitrophenyl ester, can also be used.

Any conventional insulin as, for example, beef insulin, pig insulin, sheep insulin, whale insulin, and fish insulin can be utilized.

The reaction is preferably performed in one or more polar organic solvent in which insulin dissolves, as well as mixtures thereof with water. Dimethylsulfoxide and dimethylformamide are completely satisfactory.

The proton acceptor includes all the basic compounds which are customarily employed in peptide synthesis as, for example, triethylamine or N-methylmorpholine. The latter base is preferably employed when working with optically active carboxylic acids in order to avoid racemization. When working in the presence of water, it is also possible to use alkali metal, hydroxides, bicarbonates or carbonates, such as sodium bicarbonate, sodium carbonate and the like.

Generally temperatures of between 0° and 40°, preferably 18° to 25°C. are used. The reactions are usually

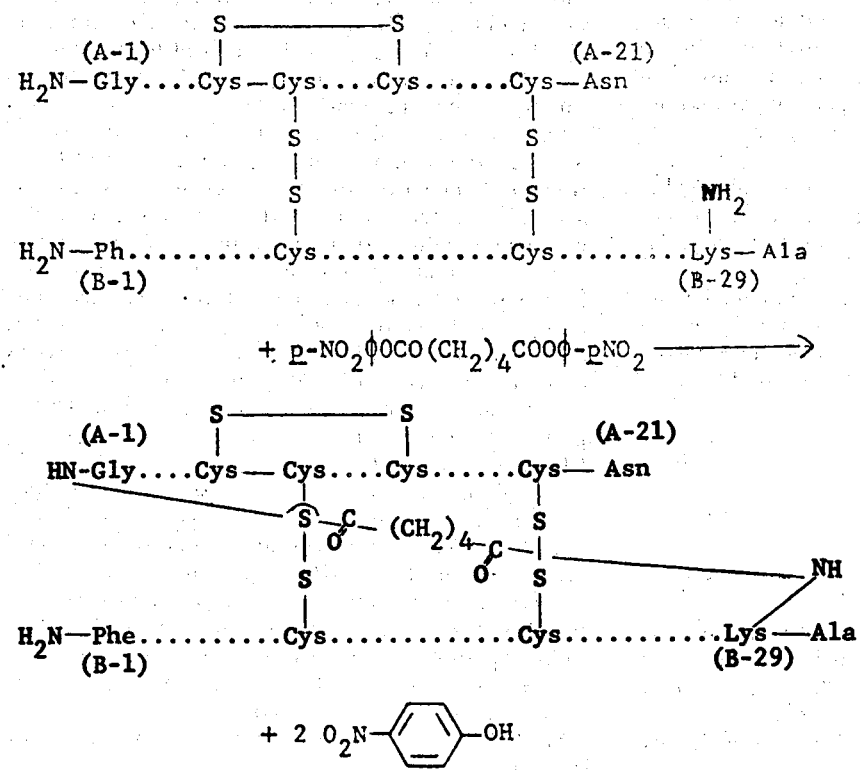

Suitable activated derivatives of dicarboxylic acids are known or can be readily manufactured according to known processes; see e.g., Zahn et al., Chem. Ber. 96, 1747 (1963); Schnell et al., Kolloid-Z. 203, 27 (1965); Zahn et al., Forschungsber. des Landes Nordrhein-Westfalen, No. 1897, Brandt, Ed., Westdeutscher Verlag, Cologne and Opladen (1967). The preferred derivatives in which Y is a substituted phenoxy group can be prepared from the dicarboxylic acid, the appropriately substituted phenol, and dicyclohexylcarbodiimide.

Examples of these activated derivatives include adipic acid bis-p-nitrophenyl ester, pimelic acid bis-N-hydroxysuccinimide ester, suberic acid bis-2,4,5-trichlorophenyl ester, sebacic acid bis-pentachlorophenyl ester and the like. Amino acids which possess two carboxyl groups in an activated form but in which the amino groups are protected, such as N,N′-bis-tert.-butoxycarbonyl-cystine-bis-2,4,5- carried out under normal pressure. It is advantageous, but not essential, to exclude light and oxygen by working in the dark under a protective gas such as nitrogen to avoid side-reactions such as oxidative damage to the insulin.

In carrying out the process, 1 to 2 moles, preferably 1.2 to 1.3 moles, of the activated dicarboxylic acid derivative are generally employed per each mole of crystal insulin or amorphous insulin. Conveniently the solution of the activated derivative is slowly added, dropwise, usually over the course of 1 to 5 hours, to the solution of the insulin. The reaction mixture is then allowed to stand for several hours longer, with stirring if necessary.

Insolation can be effected by adding a solvent which is miscible with the reaction solvent and which effects precipitation of the insulin derivatives; e.g., methanol or ether. One can also dialyze the reaction solution against water and isolate the insulin derivative in this way. The mixture can be acidified, for example with acetic acid, to stop the reaction before the dialysis. Dialysis against dilute ammonium bicarbonate solution, in which residual activated groups of the dicarboxylic acid are aminolyzed, has also proved advantageous.

After dialysis, the product can be lyophilized directly or the deisred insulin derivative can be precipitated by adjusting the pH to the iso-electric point of the derivative.

The crude insulin derivative generally is then fractionated, either while moist or after drying, to separate the product in accordance with its molecular weight. Preferably this is accomplished by gel chromatography utilizing conditions under which insulin and the derivatives do not aggregate. For example, Sephadex G-50 fine resin in 10 per cent strength acetic acid can be used for this purpose. The preparation obtained after dialysis and freeze-drying is generally then further fractionated so as to separate molecules according to their charge. For this, ion exchange chromatography or electrophoretic processes can be used. Preferably, an ion exchange chromatography is employed in an acid medium, for example on SE-Sephadex A 25 at pH 3.0 in acetic/7 M urea, using a sodium chloride gradient.

The product obtained after dialysis, freeze-drying and, where necessary, desalination by means of gel filtration, for example of Sephadex G 25, or by isoelectric repricipitation can, if necessary, be further purified by subsequent ion exchange chromatography in a weakly alkaline solution, for example on DEAE-Sephadex A 25 at pH 8.4.

Typical compounds of the invention include
$N^{A-1}$, $N^{B-29}$ -oxalylinsulin (beef);
$N^{A-1}$, $N^{B-29}$ -succinylinsulin (beef);
$N^{A-1}$, $N^{B-29}$ -glutarylinsulin (beef);
$N^{A-1}$, $N^{B-29}$ -dipolylinsulin (beef, sheep);
$N^{A-1}$, $N^{B-29}$ -pimeloylinsulin (beef);
$N^{A-1}$, $N^{B-29}$ -suberoylinsulin (beef);
$N^{A-1}$, $N^{B-29}$ -azelaoylinsulin (beef);
$N^{A-1}$, $N^{B-29}$ -sebacoylinsulin (beef, pig);
$N^{A-1}$, $N^{B-29}$ -undecanedioylinsulin (beef);
$N^{A-1}$, $N^{B-29}$ -dodecanedioylinsulin (beef);
$N^{A-1}$, $N^{B-29}$ -tridecanedioylinsulin (beef);
$N^{A-1}$, $N^{B-29}$ -(N,N'-bis-tert.-butoxycarbonyl)-L-cystinylinsulin (beef);
$N^{A-1}$, $N^{B-29}$ -L-cystinylinsulin (beef);
$N^{A-1}$, $N^{B-29}$ -N-benzyloxycarbonyl-L-glutamylinsulin (beef); and
$N^{A-1}$, $N^{B-29}$ -L-glutamylinsulin (beef).

The structure of the crosslinked insulin derivatives according to the invention can be demonstrated in a number of ways.

Insulin and all derivatives in which amino groups are monofunctionally substituted yield two products upon splitting the disulfide bonds, as for example by oxidative sulfitolysis Bailey et al., J. Biol. Chemistry 234, 1733, (1959). These two products thus correspond to separate A- and B-chains, in the form of S-sulfonates:

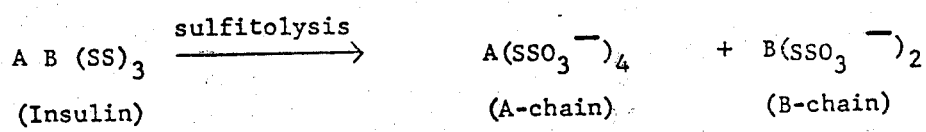

(Insulin)      (A-chain)      (B-chain)

In the case of an insulin derivative linked by means of a bifunctional bridge between glycine $^{A-1}$ and phenylalanine $^{B-1}$ or lysine $^{B-29}$ only a single chain derivative is formed:

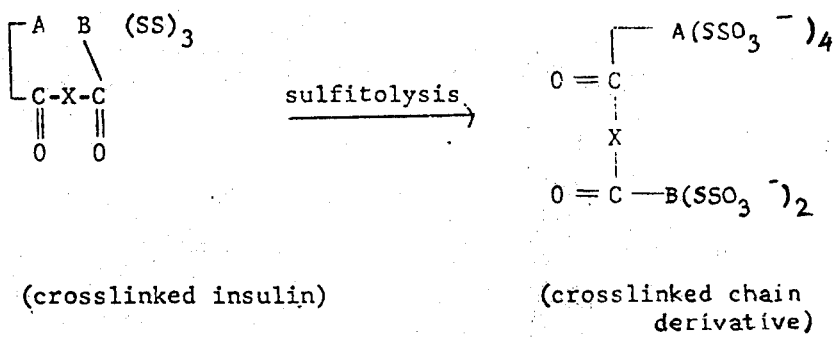

(crosslinked insulin)      (crosslinked chain derivative)

Figure 4:
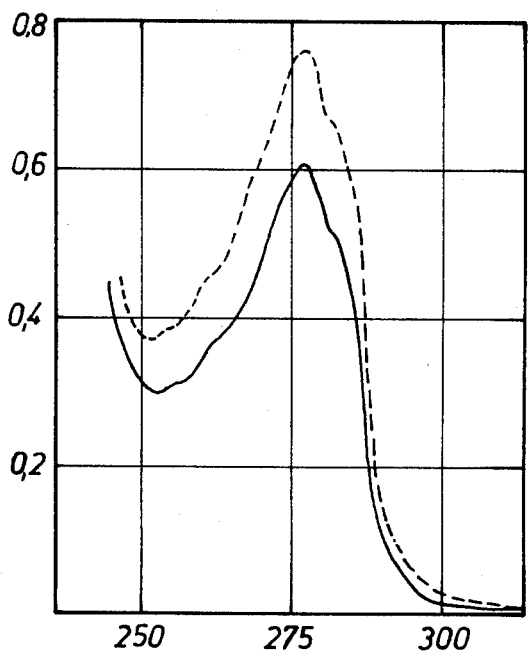

FIG. 4 comprises the UV spectra of insulin and glutarylinsulin.

Figure 1:
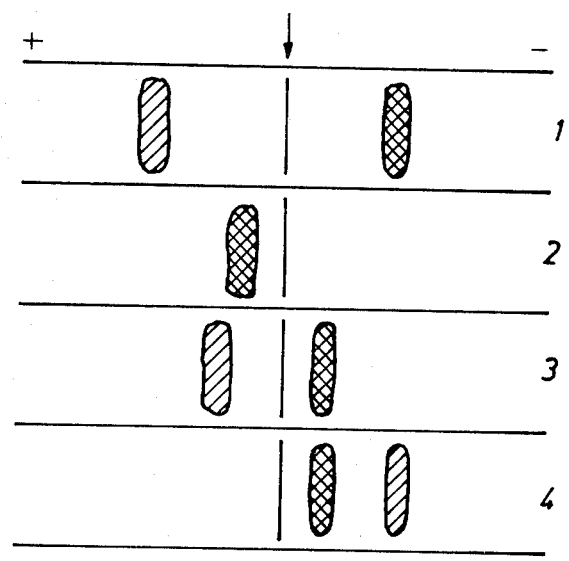
FIG. 1 shows four electropherograms for various cross-linked and degraded peptides.

As shown in FIG. 1, the compounds of Examples 1 to 4 and 6 to 9, upon being subjected to a sulfitolysis, showed only one band upon electrophoresis. The derivatives of Examples 11 and 12 which are crosslinked with cystine gave two bands, as expected, since the cystine bridge is also split.

It can also be shown by enzymatic degradation and end group determination that the bridge is located exclusively between glycine $^{A-1}$ and lysine $^{B-29}$ and not between glycine $^{A-1}$ and phenylalanine $^{B-1}$. Adipoyl-A-chain-tetra-S-sulfonate-B-chain-dis-S-sulfonate is thus split by means of trypsin according to Wang et al., Biochemistry 6, 215 (1967). After freeze-drying, the products of the reaction are separated by paper electrophoresis at pH 2 (2.4 M formic acid/7 M urea), as shown in FIG. 1, No. 3. Only the two split peptides indicated in the following table are found. All other crosslinked insulins (Examples 1 to 4 and 6 to 9) give the same results on electrophoretic analysis and end group determination. The table which follows shows the aminoacid composition of the derivative $n^{A-1}$, $n^{B-29}$-adipoyl-A-chain-tetra-S-sulfonate-B-chain-bis-S-sulfonate (A—AD—B) obtained from adipoylinsulin by oxidative sulfitolysis, and of the peptides obtained therefrom by splitting with trypsin, $N^{A-1}$, $N^{B-29}$-adipolyl-A-chain-tetra-sulfonate-B(23–30), which is designated A—A-D—B(23–30), and B(1–22)-bis-S-sulfonate, which is designated B(1–22). The aminoacid analysis was conducted according to the method of Moore and Stein, with a hydrolysis time of 48 hours at 110°C. All values are uncorrected and relative to glycine.

| Aminoacid | A-Ad-B | A-Ad-B (23–30) | B (1–22) |
|---|---|---|---|
| LYS | 1.08 | 0.97 | 0 |
| HIS | 2.05 | 0 | + |
| ARG | 1.04 | 0 | 1.16 |
| ASP | 3.43 | 1.95 | 0.81 |
| THR | 1.13 | 1.07 | 1.69 |
| SER | 2.80 | 1.73 | 1.28 |
| GLU | 6.80 | 3.72 | 1.34 |
| PRO | 1.48 | + | 0 |
| GLY | 4.00 | 2.00 | 2.00 |
| ALA | 3.28 | 2.00 | 0.90 |
| Half-cystine | 4.72 | 3.61 | + |
| VAL | 5.06 | 1.70 | 4.05 |
| ILE | 0.70 | 0 | 0 |
| LEU | 6.33 | 1.91 | 3.70 |
| TYR | 4.10 | 2.68 | 0.71 |
| PHE | 3.14 | 2.03 | 1.50 |

+denotes that the substance is present but was not determined quantitatively.
B(23–30) = aminoacid sequence 23–30 of the B-chain
B(1–22) = aminoacid sequence 1–22 of the B-chain Referring now to the drawings, FIG. 1 shows four paper electropherograms at pH 2 (buffer: 2.4 M HCOOH/7 M urea) of:
1. A-chain (left and B-chain (right) in the S-sulfonate form;
2. $N^{A-1}$, $N^{B-29}$-adipoyl-A-chain-tetra-S-sulfonate-B-chain-bis-S-sulfonate;
3. the split peptides obtained therefrom by degradation by trypsin; and
4. the split peptides obtained from insulin-B-chain-S-sulfonates with trypsin. B (1–22) (left) and B (23–29) (right).

Coloration was produced by means of diazotized sulfanilic acid. The arrow marks the starting line of the electrophoroses.

Figure 2:
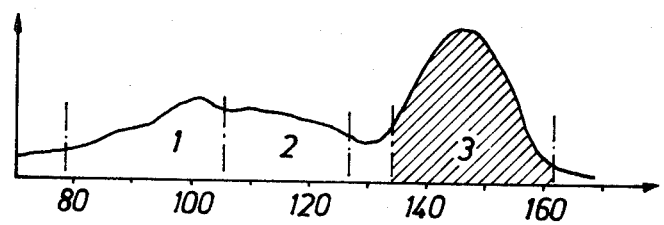
FIG. 2 is the elution diagrams of a gel chromatography of azelaoylinsulin.

FIG. 2 shows the elution diagram of gel chromatography of approximately 600 mg of the crude azelaoylinsulin obtained in Example 8 on a 5 × 150 cm column with Sephadex G-50 fine in 10% strength acetic acid using a flow speed 100 ml/hour and taking fractions of 12 ml. The abscissa corresponds to fraction number while the ordinate is extinction at 254 nanometers (nm). Fraction 1 contains oligomeric insulin derivatives, fraction 2 contains mainly dimeric insulin derivatives and fraction 3 contains monomeric insulin derivatives. The elution diagrams of the gel chromatography of the other bifunctionally cross-linked insulin derivatives show a similar pattern.

Figure 3:
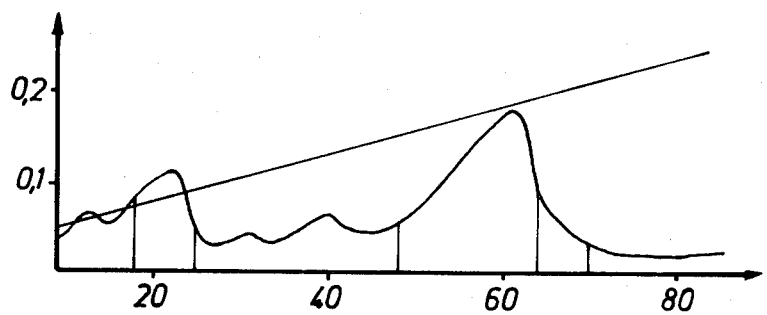
FIG. 3 is the elution diagram of an ion exchange chromatography of suberoyl-insulin.

FIG. 3 shows the elution diagram of the ion exchange chromatography of 320 mg of the crude suberoylinsulin obtained in Example 7, fraction 3, on a 1.5 × 45 cm column with SE-Sephadex at pH 3.0 with a linear sodium chloride gradient and a flow speed 30–35 ml/hour. Fractions of 6.8 ml were taken with extinction measured at 254 nm. The abscissa corresponds to fraction number while the ordinate is the concentration of sodium chloride in moles/liter. The fraction with maximum at fraction number 60 corresponds to insulin derivative with the suberoyl bridge between glycine $^{A-1}$ and lysine$^{B-29}$. The elution diagrams of the ion exchange chromatography of the other bifunctionally crosslinked insulin derivatives are similar.

FIG. 4 comprises the UV spectra of amorphous insulin at concentration = 0.767 mg/ml (shown with a dotted line), and glutarylinsulin at concentration = 0.636 mg/ml (shown with a solid line) in 0.05 M ammonium bicarbonate solution at pH 8.2. The ordinate is extinction and the abscissa is wavelength in nanometers (nm).

The new compounds display a blood glucose-lowering action and are therefore suitable for the treatment of diabetics in general and especially those who, as a result of the formation of antibodies against beef insulin and/or pig insulin require high doses of conventional insulin preparations, but whose requirements are satisfactorily met, according to experience, by lower doses after changing over to a new preparation against which no antibodies are formed.

The present invention includes pharmaceutical compositions and medicaments in dosage unit form containing the new compounds. In common with known insulins and insulin derivatives, the new compounds are generally administered by injection. Accordingly this invention provides a sterile aqueous injectable pharmaceutical composition containing a compound according to the invention. In a preferred form of this composition, the compound is in crystalline form in suspension in a solution of a zinc salt. Conventional additives may also be present.

This invention further provides a medicament in dosage unit form. The expression "medicament in dosage unit form" as used in this specification means a discrete coherent article containing a predetermined individual quantity of the insulin derivative such that one article is utilized in a single therapeutic administration. A preferred example of a medicament in dosage unit form according to the invention is an ampoule containing predetermined quantity of the insulin derivative mixed with a diluent. Another form is an ampoule containing a predetermined quantity of a compound according to the invention in crystalline form. The ampoule is broken open and its contents mixed with a suitable injectable diluent immediately before administration.

The pharmacological activity of these derivatives can be conveniently observed in known laboratory models. Thus insulin lowers the blood glucose levels of rats and within limits, this action is dose-dependent. The insulin activity on blood glucose of the insulin derivatives can be determined by comparative calculation of the blood glucose lowering in rats after subcutaneous injection of preparations with an unknown insulin activity and the blood glucose lowering after subcutaneous injection of insulin having a known content of active compound. See, e.g., Zahn et al., Hoppe Seyler's Z. Physiol. Chem. 349, 385 to 389 (1968).

The following table presents the insulin activity on blood glucose of a number of compounds according to the invention. Activity is expressed as percentage of the insulin standard (25.4 IU/mg).

| Active Compound | Insulin Activity |
| --- | --- |
| $N^{A-1}$, $N^{B-29}$-oxalylinsulin (beef) | 52 |
| $N^{A-1}$, $N^{B-29}$-glutarylinsulin (beef) | 32 |
| $N^{A-1}$, $N^{B-29}$-adipoylinsulin (beef) | 41 |
| $N^{A-1}$, $N^{B-29}$-pimeloylinsulin (beef) | 35 |
| $N^{A-1}$, $N^{B-29}$-suberoylinsulin (beef) | 100 |
| $N^{A-1}$, $N^{B-29}$-azelaoylinsulin (beef) | 100 |
| $N^{A-1}$, $N^{B-29}$-sebacoylinsulin (beef) | 61 |
| $N^{A-1}$, $N^{B-29}$-undecanedioylinsulin (beef) | 69 |
| $N^{A-1}$, $N^{B-29}$-dodecanedioylinsulin (beef) | 46 |
| $N^{A-1}$, $N^{B-29}$-tridecanedioylinsulin (beef) | 40 |

The following examples will serve to further illustrate the production, by the process of the invention, of the present cross-linked insulin derivatives. These examples should not be construed as a limitation on the scope of the invention which is defined only by the appended claims.

EXAMPLE 1

$N^{A-1}$, $N^{B-29}$-oxalylinsulin (beef)

A solution of 39.8 mg (120 μmol) of oxalic acid bis-p-nitrophenyl ester in 5 ml of dimethylsulfoxide was added dropwise over the course of 4 hours at room temperature, with stirring, to a solution of 640 mg (100 82 mol) of crystalline beef insulin and 150 μl of triethylamine in 75 ml of dimethylsulfoxide. The reaction solution was left to stand for a further 60 hours at room temperature and was then dialyzed first for 2 hours against running water and subsequently twice for one hour at a time against one liter of 0.05 M ammonium bicarbonate solution. The solution was adjusted to pH 4.9 with dilute hydrochloric acid and the protein which precipitated was collected by centrifugation and washed with water. The moist product was dissolved in 3 ml of glacial acetic acid and 17 ml of water and chromatographed on a column (5 × 150 cm) with Sephadex G-50 fine in 10% strength acetic acid. The eluate was dialyzed in 3 fractions (compare FIG. 2), 4 times against 1 liter of distilled water at a time, and subsequently lyophilized.

Weighings:

| Fraction 1 | 70 mg |
| Fraction 2 | 216 mg |
| Fraction 3 | 315 mg (49.3% of theory) |

310 mg of fraction 3 were dissolved in 3 ml of 1.5 M acetic acid/7 M urea/0.05 M sodium chloride (pH 3.0) and applied to a column (1.5 × 45 cm) with SE-Sephadex which was equilibrated with the same buffer.

Elution was carried out by means of a linear gradient of 250 ml of starting buffer and 250 ml of added buffer which had the same composition as the starting buffer but contained 0.2 M sodium chloride. The eluate under the maximum (compare FIG. 3) was dialyzed 3 times for 1 hour at a time against 1 liter of distilled water and lyophilized. The residue was freed of the residual salt and urea by chromatography on a 3 × 60 cm column with Sephadex G-25 in 0.05 M ammonium bicarbonate solution and the eluate was lyophilized.

Yield: 98.2 mg (15% of theory).

$\epsilon 278 = 5,490$ (in 0.05 M ammonium bicarbonate solution, pH 8.2) (compare FIG. 5).

Paper electrophoresis at pH 2: single substance.

$R_{Ins}$ (electrophoretic mobility, relative to insulin) = 0.74.

Free amino groups using the dansyl chloride method of Gray, Methods in Enzymology, Volume 11, 139, (1967) showed only phenylalanine.

Oxalylinsulin crystallizes in the form of small prisms from citrate buffer containing zinc ions, see Schlichtkrull, Acta Chem. Scand. 10, 1455 (1956).

EXAMPLE 2

$N^{A-1}$, $N^{B-29}$-succinylinsulin (beef)

640 mg of crystalline beef insulin were reacted over the course of 3 hours with 43.2 mg (120 μmol) of succinic acid bis-p-nitrophenyl ester under the conditions described in Example 1. The product was worked up and gel chromatography was carried out as therein described.

| Fraction 1 | 90 mg |
| Fraction 2 | 105 mg |
| Fraction 3 | 411 mg (64.2% of theory) |

410 mg of fraction 3 were chromatographed on SE-Sephadex, and worked up as described in Example 1. The main fraction (compare FIG. 3) after chromatography on Sephadex G-25 yielded 139 mg (21.7% of theory) of succinylinsulin.

$\epsilon 278 = 5,540$ (in 0.05 M ammonium bicarbonate solution, pH 8.2).

Paper electrophoresis at pH 2: single substance $R_{Ins} = 0.77$

Free amino groups: phenylalanine

Crystal form: spherical particles

EXAMPLE 3

$N^{A-1}$, $N^{B-29}$-glutarylinsulin (beef)

640 mg of crystalline beef insulin were reacted with 44.8 mg (120 μmol) of glutaric acid bis-p-nitrophenyl ester under the conditions described in Example 1. Work-up and gel chromatography were also as therein described.

Weighings:

| Fraction 1 | 54 mg |
| Fraction 2 | 195 mg |
| Fraction 3 | 330 mg (51.6% of theory) |

320 mg of fraction 3 were chromatographed on SE-Sephadex, and worked up as described in Example 1, after desalination by gel filtration on Sephadex G-25, followed by iso-electric reprecipitation at pH 4.8, 110.3 mg (17.3% of theory) of glutarylinsulin were obtained from the main fraction (compare FIG. 3).

$\epsilon 278 = 5,400$ (in 0.05 M ammonium bicarbonate solution)

Paper electrophoresis at pH 2: single substance
$R_{Ins} = 0.74$
Free amino groups: phenylalanine
Crystal form: felted small needles.

EXAMPLE 4

N $^{A-1}$, N $^{B-29}$-adipoylinsulin (beef)

A solution of 93.2 mg (240 μmol) of adipic acid bis-p-nitrophenyl ester in 5 ml of dimethylsulfoxide was added dropwise at room temperature with stirring to 1.27 g (200 μmol) of crystalline beef insulin in 140 ml of dimethylsulfoxide in the presence of 0.3 ml of triethylamine. After standing for 60 hours at room temperature, the reaction solution was worked up as described in Example 1. Upon gel chromatography on Sephadex G-50 fine in 10% strength acetic acid, the following were obtained:

| | |
|---|---|
| Fraction 1 | 304 mg |
| Fraction 2 | 335 mg |
| Fraction 3 | 587 mg (46.2% of theory) |

580 mg of fraction 3 were chromatographed in two equal parts on SE-Sephadex in the manner described in Example 1. The main fractions (compare FIG. 3) were combined after freeze-drying and desalinated by gel filtration as described in Example 1.
Yield: 294 mg (23% of theory) of adipoylinsulin
$\epsilon 276 = 5,650$ (in 0.05 M ammonium bicarbonate solution, pH 8.2)
Paper electrophoresis at pH 2: singe substance
$R_{Ins} = 0.73$
Free amino groups: phenylalanine
Crystal form: small needles and spherical particles.

7.8 mg (20 μmol) of adipic acid bis-p-nitrophenyl ester in 2.5 ml of dimethylsulfoxide were added dropwise over the course of 2 hours, with stirring to a solution of 120 mg (18.7 μmol) of crystalline beef insulin in 15 ml of dimethylsulfoxide and 30 μl of triethylamine. A further 7.8 mg of the ester in 2.5 ml of dimethylsulfoxide were then added dropwise over the course of 1 hour. The reaction solution was immediately treated with methanol/ester and the insulin derivative which precipitated was washed with methanol/ether (1:9), briefly dried in vacuo, dissolved in a mixture of 1 ml of glacial acetic and 9 ml of water, and applied to a column (3 × 200 cm) of Sephadex G-50 fine in 10% strength acetic acid and chromatographed. The eluates (compare FIG. 1) where dialyzed and lyophilized.
Weighings:

| | |
|---|---|
| Fraction 1 | 29 mg |
| Fraction 2 | 14 mg |
| Fraction 3 | 55 mg (45.8% of theory) |

EXAMPLE 5

N $^{A-1}$, N $^{B-29}$-adipoylinsulin (sheep)

A solution of 23.3 mg (60 μmol) of adipic acid bis-p-nitrophenyl ester in 4 ml of dimethylsulfoxide was added dropwise over the course of 4 hours at room temperature, with stirring to a solution of 320 mg of crystalline sheep insulin (50 μmol) in 35 ml of dimethylsulfoxide and 75 ul of triethylamine. The reaction mixture was allowed to stand for a further 48 hours at room temperature and was then worked up as indicated in Example 1. The crude product was chromatographed on Sephadex (column: 3 × 200 cm) as in Example 1.
Weighings:

| | |
|---|---|
| Fraction 1 | 88 mg |
| Fraction 2 | 74 mg |
| Fraction 3 | 94 mg (29.4% of theory) |

According to quantitative paper electrophoresis, fraction 3 contained 59% of N $^{A-1}$, N $^{B-29}$-adipolyinsulin.

EXAMPLE 6

N $^{A-1}$, N $^{B-29}$-pimeloylinsulin (beef)

640 mg of crystalline beef insulin were reacted with 48.2 mg (120 μmol) of pimelic acid bis-p-nitrophenyl ester under the conditions described in Example 1. After 44 hours, the reaction mixture was worked up and the crude product was chromatographed.
Weighings:

| | |
|---|---|
| Fraction 1 | 194 mg |
| Fraction 2 | 111 mg |
| Fraction 3 | 288 mg (45% of theory) |

280 mg of the fraction 3 were chromatographed on SE-Sephadex as described in Example 1. The product isolated from the main fraction (compare FIG. 3) was desalinated on Sephadex G-25.
Yield: 132 mg (20.6% of theory)
$\epsilon 278 = 5,970$ (in 0.05 M ammonium bicarbonate solution, pH 8.2)
Electrophoretic purity: 95%
$R_{Ins} = 0.73$
Free amino groups: phenylalanine
Crystal form: felted needles

EXAMPLE 7

N $^{A-1}$, N $^{B-29}$-suberoylinsulin (beef)

640 mg of crystalline beef insulin were reacted with 49.9 mg (120 μmol) of suberic acid bis-p-nitrophenyl ester and worked up after 48 hours as described in Example 1. After gel filtration, the following fractions were obtained:

| | |
|---|---|
| Fraction 1 | 137 mg |
| Fraction 2 | 122 mg |
| Fraction 3 | 331 mg (51.7% of theory) |

320 mg of fraction 3 were chromatographed on SE-Sephadex as described in Example 1. The main fraction (see FIG. 3) was desalinated on Sephadex G-25, subsequently reprecipitated isoelectrically at pH 4.8, and again lyophilized.
Yield: 138.8 mg (21.6% of theory)
$\epsilon 278 = 5,110$ (in 0.05 M ammonium bicarbonate solution, pH 8.2)
Electrophoretic purity (pH 2): 98%
$R_{Ins} = 0.74$
Free amino groups: phenylalanine
Crystal form: small needles

EXAMPLE 8

N $^{A-1}$, N $^{B-29}$-acelaoylinsulin (beef)

640 mg of crystalline beef insulin were reacted with 51.6 mg (120 μmol) of azelaic acid bis-p-nitrophenyl ester, as described in Example 1. After the gel filtration (see FIG. 2) the following were obtained:

| Fraction 1 | 166 mg |
| Fraction 2 | 121 mg |
| Fraction 3 | 311 mg (48% of theory) |

300 mg of fraction 3 were chromatographed SE-Sephadex as described in Example 1. Working up the main fraction (compare FIG. 3) after desalination yielded 134.3 mg of azelaoylinsulin (21% of theory).

$\epsilon 278 = 6,060$ (in 0.05 M ammonium bicarbonate solution)

Electrophoretic purity (pH 2): 94%

$R_{Ins} = 0.77$

Free amino groups: phenylalanine

Crystal form: small needles

EXAMPLE 9

$N^{A-1}, N^{B-29}$-sebacoylinsulin (beef)

640 mg of crystalline beef insulin were reacted with 53.3 mg (120 μmol) of sebacic acid bis-p-nitrophenyl ester as described in Example 1 except that working up was caried out by isolating the reaction product, after dialysis, by freeze-drying. The crude product was dissolved in 4 ml of glacial acetic acid and 16 ml of water and chromatographed as in Example 1.

Weighings:

| Fraction 1 | 175 mg |
| Fraction 2 | 143 mg |
| Fraction 3 | 278 mg (43% of theory) |

270 mg of fraction 3 were chromatographed on SE-Sephadex as described in Example 1 and the main product (compare FIG. 3) was desalinated on Sephadex G-25.

Yield: 121.2 mg (19% of theory)

$\epsilon 278 = 5,500$

Paper electrophoresis at pH 2: single substance $R_{Ins} = 0.78$

Free amino groups: phenylalanine

Crystal form: small needles

EXAMPLE 10

$N^{A-1}, N^{B-29}$-sebacoylinsulin (pig)

640 mg of crystalline pig insulin were reacted with 53.3 mg (120 μmol) of sebacic acid bis-p-nitrophenyl ester as described in Example 1. After standing for 20 hours at room temperature, the mixture was worked up as therein described.

Weighings after gel filtration:

| Fraction 1 | 190 mg |
| Fraction 2 | 139 mg |
| Fraction 3 | 280 mg (43.7% of theory) |

Fraction 3 contained 70% of sebacoylinsulin according to quantitative electrophoretic analysis.

EXAMPLE 11

$N^{A-1}, N^{B-29}$-(bis-N,N'-tert.-butyloxycarbonyl)-cystinylinsulin (beef)

a. A solution of 95.8 mg (120 μmol) of N,N'-bis-tert.-butyloxycarbonyl-cystine-2,4,5-trichlorophenyl ester in 5 ml of dimethylsulfoxide was added dropwise over the course of 5 hours, with stirring to a solution of 640 mg of crystalline beef insulin in 75 ml of dimethylsulfoxide and 150 μl of triethylamine at room temperature, with stirring. After standing for 22 hours the reaction mixture was worked up as described in Example 1. The crude product was chromatographed on Sephadex G-50 in 10% strength acetic acid.

Weighings:

| Fraction a-1 | 191 mg |
| Fraction a-2 | 132 mg |
| Fraction a-3 | 261 mg (40.8% of theory) | b. The reaction was carried out under the same conditions as in Example 11 (a) but using 110 μl of N-methylmorpholine as the base.

Weighings:

| Fraction b-1 | 206 mg |
| Fraction b-2 | 159 mg |
| Fraction b-3 | 272 mg (42.5% of theory) |

250 mg of fraction a-3 were separated on SE-Sephadex as described in Example 1. The main fraction was desalinated by chromatography on Sephadex G-25.

Yield: 103.6 mg (16.5% of theory)

$\epsilon 278 = 5,400$ (in 0.05 M ammonium bicarbonate solution, pH 8.2)

Paper electrophoresis (at pH 2): single substance $R_{Ins} = 0.77$

Free amino groups: phenylalanine

In the same manner, 91.8 mg (14.3% of theory) of (bis-butoxycarbonyl)-cystinyl-insulin were obtained from 260 mg of fraction b-3.

$\epsilon 278 = 5,900$

Paper electrophoresis (at pH 2): single substance $R_{Ins} = 0.70$

Free amino groups: phenylalanine

EXAMPLE 12

$N^{A-1}, N^{B-29}$-cystinyl-insulin (beef)

40 mg of $N^{A-1}, N^{B-29}$-(bis-butyloxycarbonyl)-cystinyl-insulin were dried for 15 hours in vacuo over phosphorus pentoxide and potassium hydroxide in a centrifuge tube. Trifluoroacetic acid (0.3 ml) was then added and the solution was allowed to stand for 1 hour at room temperature. The protein was subsequently precipitated by means of 10 ml of absolute ether and the residue collected by centrifugation and repeatedly washed with ether.

Yield after drying in vacuo over phosphorus pentoxide and potassium hydroxide: 42 mg (approximately 96% of theory)

$\epsilon 278 = 5,560$ (in 0.05 M ammonium bicarbonate solution)

Electrophoretic purity (at pH 2): single substance $R_{Ins} = 1.0$

EXAMPLE 13

$N^{A-1}, N^{B-29}$-(N-benzyloxycarbonyl)-glutamylinsulin (beef)

A solution of 62.7 mg (120 μmol) of N-benzyloxycarbonyl-glutamic acid α, γ-bis-p-nitrophenyl ester was added dropwise over the course of 5 hours at room temperature, with stirring to a solution of 640 mg of crystalline beef insulin in 75 ml of dimethylsulfoxide and 110 μl of N-methylmorpholine. After standing for 22 hours the mixture was worked up as described in Example 1 and subsequently chromatographed.

Weighings:

| Fraction 1 | 106 mg |
| Fraction 2 | 129 mg |
| Fraction 3 | 257 mg (40.2% of theory) |

250 mg of fraction 3 were chromatographed on SE-Sephadex as described in Example 1. After desalination by chromatography on Sephadex G-25, 105 mg (16.4% of theory) of product were obtained.

Electrophoretic purity (pH 2): 95%
$R_{Ins} = 0.76$
Free amino groups: phenylalanine.

EXAMPLE 14

$N^{A-1}$, $N^{B-29}$-undecanedioylinsulin (beef)

640 mg of crystalline beef insulin were reacted with 55.0 mg (120 μ mol) of undecane dicarboxylic acid bis-p-nitrophenyl ester, as described in Example 1 except that the reaction products were worked up 18 hours after the addition of the ester. After gel filtration (see FIG. 2) the following fractions were obtained:

| Fraction 1 | 144 mg |
| Fraction 2 | 117 mg |
| Fraction 3 | 311 mg (48.6% of theory) |

300 mg of fraction 3 were chromatographed on a 2.7 × 40 cm column of SP-Sephadex as described in Example 1, utilizing, however, 700 ml of the 2 buffer solutions. The working up of the main fraction (compare FIG. 3) after desalination yielded 139 mg of undecanedioylinsulin (22.5% of theory).

$\epsilon 278 = 5{,}390$ (in 0.05 M ammonium bicarbonate solution, pH 8.2)
Paper electrophoresis (at pH 2): single substance
$R_{Ins} = 0.74$
Free amino groups: phenylalanine
Crystal form: spherical particles

EXAMPLE 15

$N^{A-1}$, $N^{B-29}$-dodecanedioylinsulin (beef)

640 mg of crystalline beef insulin were reacted with 56.7 mg (120 μmol) of dodecane dicarboxylic acid bis-p-nitrophenyl ester, as described in Example 1 with the reaction products being worked up 18 hours after the addition of the ester. Upon gel filtration (see FIG. 2) the following were obtained:

| Fraction 1 | 140 mg |
| Fraction 2 | 157 mg |
| Fraction 3 | 276 mg (43.1% of theory) |

260 mg of fraction 3 were chromatographed on a column (2.7 × 40 cm) filled with SP-Sephadex as described in Example 1, with, however, the volumes of the two buffer solutions being 700 ml each. Working up of the main fraction (compare FIG. 3) after desalination yielded 108 mg dodecane dioylinsulin (17.9% of theory).

$\epsilon 278 = 5{,}870$ (in 0.05 M ammonium bicarbonate solution)
Paper electrophoresis (at pH 2): single substance
$R_{Ins} = 0.73$.
Free amino groups: phenylalanine
Crystal form: spherical particles

EXAMPLE 16

$N^{A-1}$, $N^{B-29}$-tridecanedioylinsulin (beef)

640 mg of crystalline beef insulin were reacted with 58.4 mg (120 μmol) tridecane diacid bis-p-nitrophenyl ester, as described in Example 1 with work-up 18 hours after the addition of the ester. Upon gel filtration (see FIG. 2) the following were obtained:

| Fraction 1 | 143 mg |
| Fraction 2 | 154 mg |
| Fraction 3 | 297 mg (46.4% of theory) |

290 mg of fraction 3 were chromatographed on a column (2.7 × 40 cm) filled with SP-Sephadex as described in Example 1 with the volumes of the two buffer solutions being 700 ml each. The working up of the main fraction (compare FIG. 3) after desalination yielded 109 mg tridecanedioylinsulin (17.4% of theory).

$\epsilon 278 = 5{,}880$ (in 0.05 M ammonium bicarbonate solution, pH 8.2)
Paper electrophoresis (at pH 2): single substance
$R_{Ind} = 0.75$
Free amino groups: phenylalanine
Crystal form: spherical particles

What is claimed is:

1. A bifunctionally crosslinked insulin derivative in which the amino group of the A-1 glycine is linked to the ε-amino group of the B-29 lysine by a bridge of the formula:

$$-\underset{\underset{O}{\|}}{C}-X-\underset{\underset{O}{\|}}{C}-$$

in which
X is a carbon-carbon bond, alkylene of 1 to 15 carbon atoms or alkylene of 1 to 15 carbon atoms in which two of said carbon atoms are replaced by sulfur or wherein said alkylene is substituted at one or two of the remaining carbon atoms by an amino or amido group.

2. A monomeric A-1, B-29 crosslinked insulin derivative of the formula

```
(A-1)
Gly————————————————————NH
 :                       |
 :                       C=O
Cys—S—S                  |
 |    |      (A-21)      |
Cys···Cys····Cys——Asn     |
 |         |             X
 S         S             |
 |         |             |
 S         S             C=O
 |         |             |
(B-1)      |   (B-29)    |
H₂N—Phe····Cys·········Cys····Lys————————NH
                                  |
                                 Ala
``` wherein
X is a carbon-carbon bond, an alkylene chain containing 1 to 15 carbon atoms or alkylene of 1 to 15 carbon atoms in which two of said carbon atoms are replaced by sulfur or wherein said alkylene is substituted at one or two of the remaining carbon atoms by an amino group.

3. A compound according to claim 2 wherein X is a carbon-carbon bond or alkylene of 1 to 15 carbon atoms.

4. A compound according to claim 3 in which the insulin is beef insulin.

5. A compound according to claim 3 in which alkylene is of the formula $-(CH_2)_n-$, in which $n$ is an integer from 1 to 15.

6. The compound according to claim 3 which is $N^{A-1}$, $N^{B-29}$-oxalyl insulin.

7. The compound according to claim 3 which is $N^{A-1}$, $N^{B-29}$-succinyl insulin.

8. The compound according to claim 3 which is $N^{A-1}$, $N^{B-29}$-glutaryl insulin.

9. The compound according to claim 3 which is $N^{A-1}$, $N^{B-29}$-adipoyl insulin.

10. The compound according to claim 3 which is $N^{A-1}$, $N^{B-29}$-pimeloyl insulin.

11. The compound according to claim 3 which is $N^{A-1}$, $N^{B-29}$-suberoyl insulin.

12. The compound according to claim 3 which is $N^{A-1}$, $N^{B-29}$-azelaoyl insulin.

13. The compound according to claim 3 which is $N^{A-1}$, $N^{B-29}$-sebacoyl insulin.

14. The compound according to claim 3 which is $N^{A-1}$, $N^{B-29}$-undecanedioyl insulin.

15. The compound according to claim 3 which is $N^{A-1}$, $N^{B-29}$-dodecanedioyl insulin.

16. The compound according to claim 3 which is $N^{A-1}$, $N^{B-29}$-tridecanedioyl insulin.

17. The derivative according to claim 1 which is $N^{A-1}$, $N^{B-29}$-(N,N'-bis-tert.-butyloxycarbonyl)-L-cystinyl insulin.

18. The derivative according to claim 1 which is $N^{A-1}$, $N^{B-29}$-L-cystinyl insulin.

19. The derivative according to claim 1 which is $N^{A-1}$, $N^{B-29}$-N-benzyloxycarbonyl-L-glutamyl insulin.

20. A process for the production of a compound according to claim 1 in which insulin is reacted with an activated derivative of a dicarboxylic acid having the general formula:

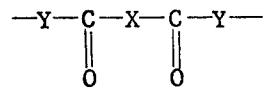

in which
X is a carbon-carbon double bond, alkylene of 1 to 15 carbon atoms or alkylene of 1 to 15 carbon atoms in which two of said carbon atoms are replaced by sulfur or wherein said alkylene is substituted at one or two of the remaining carbon atoms by an amino group, and Y is a carboxylic acid activating group, in a non-aqueous or aqueous polar organic solvent, in the presence of a proton acceptor and at a temperature of from about 0°–40° C.

21. A process according to claim 20 in which the reaction is carried out at 18° to 25°C.

22. A process according to claim 20 in which 1.2 to 1.3 mole of the activated derivative are present per mole of insulin.

23. A process according to claim 20 in which Y is an unsubstituted or substituted phenoxy group.

24. A process according to claim 20 wherein impurities are removed from the derivative by sequentially differentiating the materials present firstly by their molecular weight and secondly by their charge.

25. A process according to claim 24 in which the derivative is separated from impurities by gel chromatography under conditions where insulin and insulin derivatives do not aggregate.

26. A process according to claim 23 in which the desired compound is separated from impurities by ion exchange chromatography or by electrophoresis in an acid medium.

27. A process according to claim 20 in which the derivative is produced in crystalline form by precipitation from a solution containing a zinc salt.

* * * * *